June 1, 1943.  H. J. MURRAY, JR  2,320,641
VEHICLE SIGNAL
Original Filed July 9, 1936  2 Sheets-Sheet 1
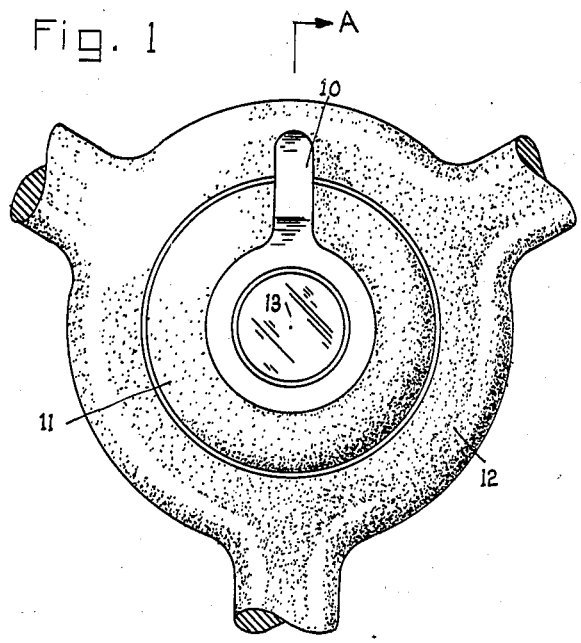
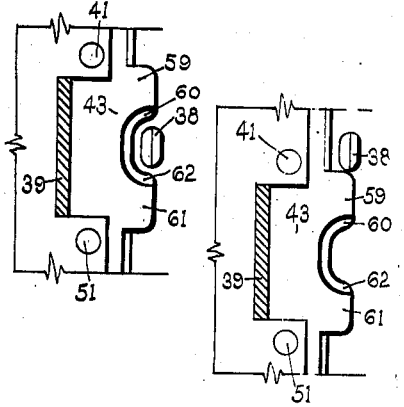
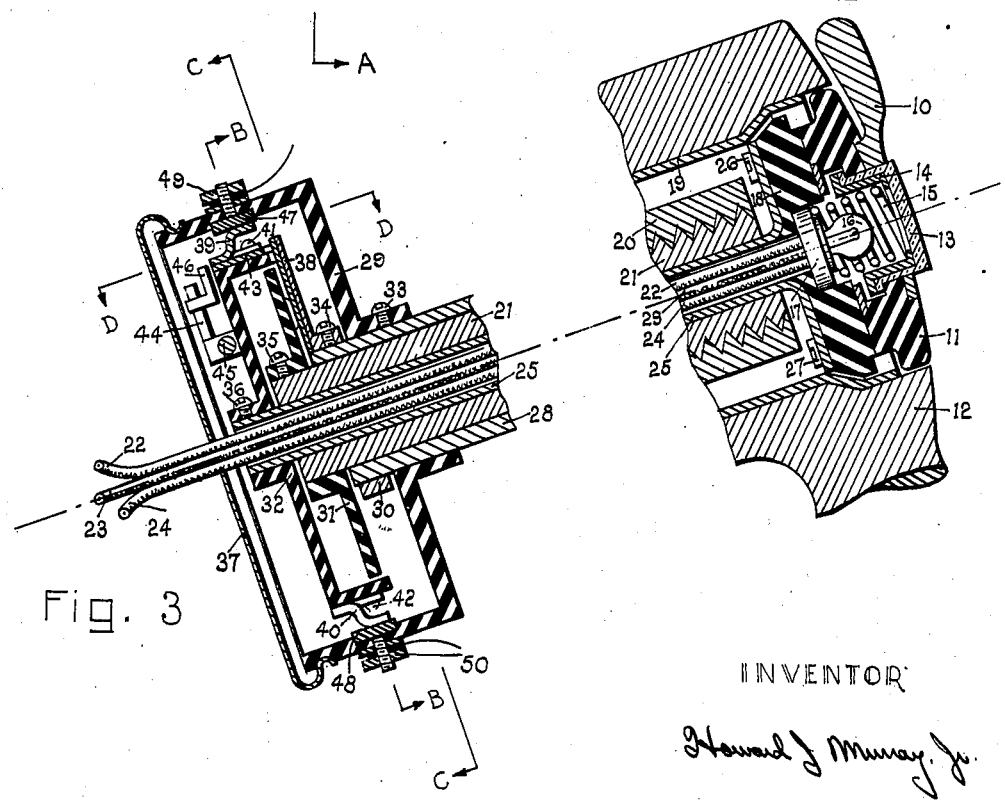
INVENTOR
Howard J. Murray, Jr.

June 1, 1943.  H. J. MURRAY, JR  2,320,641
VEHICLE SIGNAL
Original Filed July 9, 1936   2 Sheets-Sheet 2

INVENTOR
Howard J. Murray Jr.

Patented June 1, 1943

2,320,641

UNITED STATES PATENT OFFICE 2,320,641

VEHICLE SIGNAL

Howard J. Murray, Jr., New York, N. Y.

Continuation of application Serial No. 89,700, July 9, 1936. This application May 10, 1939, Serial No. 272,798

10 Claims. (Cl. 177—337)

The present invention relates to signalling, and specifically to that type of signalling by which the operator of a vehicle equipped with braking and steering mechanisms may indicate certain of his intentions to persons exterior of the vehicle.

This is a continuation of application Serial Number 89,700 filed July 9, 1936, as to all common subject matter.

One subject of the invention is to provide a pair of signal lights on such a vehicle, and to control their energization so that they may singly or in combination provide the following indications to persons exterior of the vehicle—

1. The presence of the vehicle (tail light).
2. The intent of the operator to suddenly decrease the rate of motion of the vehicle (stop light).
3. The intent of the operator to change the direction of horizontal motion of the vehicle (direction signal light).
4. Indication (1) plus indication (3) concurrently.
5. Indication (2) plus indication (3) concurrently.

Another object of the invention is to provide a control switch having a neutral position and two direction signalling positions which may be selectively actuated by the vehicle operator prior to making a contemplated turn.

A further object is to provide for the automatic return of this control switch to neutral position when the turn is actually made.

A still further object is to provide for the automatic return of this control switch to neutral position a predetermined interval of time after its actuation to a direction signalling position in the event that the contemplated turn is not made within this interval.

Still another object is to provide for a change of intention on the part of the vehicle operator by enabling him to instantly alter the position of this control switch at any time irrespective of the status of the automatic returning means.

In addition the invention proposes to eliminate the necessity of employing electro-magnets or other magnetizing devices to hold this control switch in a direction signalling position.

Another object of the invention is to provide a direction signal light which will be intermittently energized, and to provide, when necessary, a reference light for this direction signal light, so that during periods of poor visibility an observer will know that an intermittent light appearing to the right of a constantly energized light indicates an intent of the warning operator to turn his vehicle to the right. Correspondingly, an observer seing an intermittently energized light on the left of a steady light will know that the operator of the vehicle on which the lights are located intends to turn to the left.

In one embodiment the invention has as an object the employment of two single-filament electric lamps, whereby one lamp may flash as a direction signal while the other lamp operates concurrently as a constantly energized tail or stop signal. Since this constantly energized lamp is performing the function of a reference light simultaneously with its function as a tail or stop signal, it will be seen that each lamp may act, at the will of the vehicle operator, in a quadruple capacity—namely, as a stop signal, as a tail signal, as a direction signal, and as a reference signal.

In one embodiment the invention provides for a complete signalling system utilizing only two wires, the minimum number possible, from the front part of the vehicle to the rear, and employing no lamps, sockets, containers or other signalling apparatus on the rear of the vehicle in addition to a pair of single-filament electric bulbs.

In another embodiment four single-filament electric bulbs are employed, two on each side at the rear of the vehicle. In this system the direction signal light may, if desired, be in a separate casing from the stop and tail light, the only requirement being that one bulb of each type be employed on each side of the vehicle, and that the light emitted from the bulbs be visible to persons exterior of the vehicle and at the rear thereof.

A further object of the invention is to provide a pilot lamp which will indicate to the vehicle operator the status of the direction signal lights.

As a further object the invention contemplates the provision of an electro-responsive circuit breaker associated with the direction signal control switch which will be responsive as a function of the actuation of this switch to a direction signalling position for permitting its return to neutral position approximately a predetermined period of time thereafter. Such circuit breakers are well know in the art, but the current for controlling their operation has been the same current that was employed to energize the direction signals, or in other words these two elements were parts of the same circuit. If an intermittently energized direction signal be employed, however, the periodic interruption of this current will prevent the interval of operation of the circuit breaker from being predetermined with any degree of accuracy, and in practice this interval will vary widely in an undesirable manner. The present invention provides a second, or separate, circuit for this circuit breaker, so that a steady current is supplied thereto simultaneously with an intermittent current to a direction signal light.

A still further object is to provide a signal operating shaft mounted for oscillation within the steering shaft of the vehicle, and to provide means whereby the position of the signal operating shaft may be altered when the steering shaft is rotated through a predetermined angle in either direction.

Various other objects and advantages of the invention will be apparent from an inspection of the drawings and from the following description.

In the drawings:

Figure 1 is a top plan view of a central portion of a vehicle steering wheel equipped with a preferred form of control lever.

Figure 2 is a section along A—A of Figure 1.

Figure 3 is a section of an assembly near the lower end of the vehicle steering column taken on the same plane as Figure 2.

Figure 7 is an enlarged view of a portion of Figure 3 along the line D—D.

Figure 8 is a view showing the relative position assumed by the elements of Figure 7 when the control handle of Figure 1 has been moved to the left.

In the accompanying drawings the electrical parts are shown symbolically together with the mechanical parts and connections, but the showing is merely suggestive and must be modified to meet the particular requirements of the different makes of vehicles upon which the system is to be installed. Throughout the specification the same letters or numbers refer to similar elements.

Figure 4:
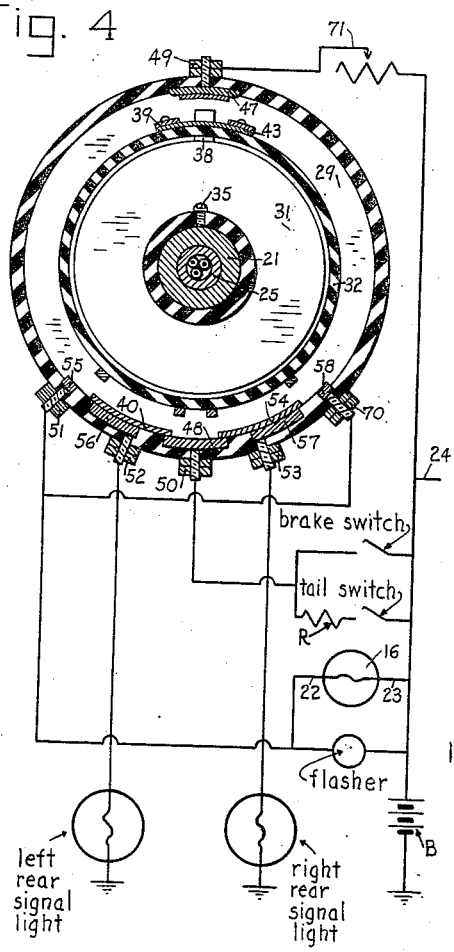
Figure 4 is a section along B—B of Figure 3, also showing in more or less diagrammatic manner a preferred form of circuit organization.

In the drawings a number of conventional elements are shown. These include a battery or source of current B, a normally open brake pedal operated switch, and a tail light switch. For convenience these two switches will hereinafter be referred to as the "brake" and "tail" switches. Also shown, in Figure 4, is a pair of standard single-filament electric lamps constituting right and left rear signal lights as illustrated, and in Figure 9 four such electric lamps arranged in groups of two. These electric lamps or groups are intended to be located on relatively opposite sides of the vehicle and so positioned that, when illuminated, the light emitted therefrom will be visible to persons exterior of the vehicle and at the rear thereof.

In addition, Figure 4 shows a current limiting resistance R and a current interrupter or flasher. This flasher is preferably of the thermostatic type, but may be motor driven or any other form known in the art. It is intended to operate at a predetermined frequency.

In the preferred form of the invention illustrated, the direction signal control switch lever and the horn button are positioned within convenient reach of the vehicle operator so as to be coincidently actuated thereby to cause the horn and/or one of the direction signal lights to be energized. In other words, these controls may be actuated separately or together with one motion of the operator's hand. Accordingly there is provided the handle or lever 10 preferably made of metal or Bakelite and securely positioned in a circular member 11 also preferably made of Bakelite.

The steering wheel 12 provided with a supporting flange 19 is keyed to the hollow steering shaft 21 of the vehicle, being held in place by the lock nut 20 in a conventional manner. Within this steering shaft 21 is concentrically mounted a hollow shaft 25, these two shafts being free to rotate independently of each other.

Shown in Figure 2 is a second molded member 18 supported on the flanged portion of the shaft 25. The two members 18 and 11 are securely fastened to each other and to the flanged portion of the shaft 25 by means of the screws 26 and 27, so that movement of the handle 10 causes a corresponding movement of the shaft 25. The steering shaft 21, of course, forms part of the vehicle steering mechanism, the remainder not being shown.

In the center of the molded member 11 is formed an opening to receive the horn button 13. This button is composed of such material as will allow light from the lamp 16 to pass through it. Beneath this horn button 13 is a stamping 14 having an open center, and this horn button assembly is designed to move in the usual manner along the sides of the opening in the molded member 11. The standard horn spring 15 is also shown, as well as horn circuit contacts, but inasmuch as the entire horn button assembly operates both electrically and mechanically in a conventional fashion no further description is believed to be necessary.

Positioned in the molded member 18 is a lamp base or support 17 holding the lamp 16, this lamp being placed within the circular horn spring 15 as shown. Within the hollow shaft 25 run two leads 22 and 23 for supplying current to the lamp 16, and also a lead 24 for supplying current to the horn button contacts in the conventional manner.

Shown in Figures 3 is a housing 29 formed of Bakelite or other insulating material and secured to the shaft 28 by means of the screw 33. This shaft 28 is fixed or non-rotatable, and is secured against such rotation through a connection to some rigid part of the vehicle, the connecting means not being illustrated. The three shafts 21, 25 and 28 are concentrically mounted. A bit-metallic thermostat 38 mounted on the ring 30 is also secured to the fixed shaft 28 by means of the screw 34.

Figure 5:
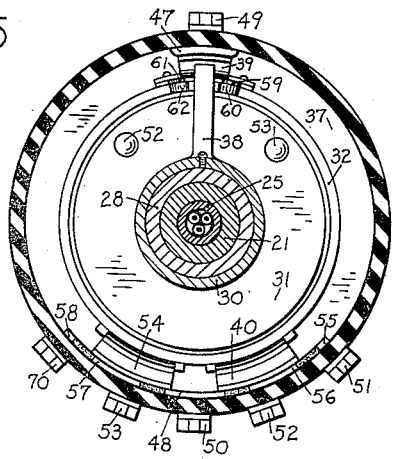
Figure 5 is a section along C—C of Figure 3.

A disc 31 provided with two cams 52 and 53 (see Figure 5) is secured to the steering shaft 21 by means of the screw 35. A flanged disc 32 formed of Bakelite or other insulating material is secured to the signal operating shaft 25 by means of the screw 36. A spring metal cover 37 encloses the open end of the housing 29, except that an opening therein allows passage of the leads 22, 23 and 24.

The outer flange of the disc 32 is formed with two curved extending portions 60 and 62, best seen by reference to Figure 7. A metal strip 43 overlies the upper surface of this flange, and itself has two curved extending portions 59 and 61, corresponding to the curved extending portions 60 and 62 of the flange. This metal strip 43, however, is cut away or recessed between the curved extending portions in the manner best shown in Figure 7.

Figure 6:
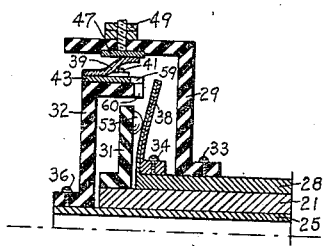
Figure 6 is a detailed view of certain parts of Figure 3, showing the position assumed by the thermostatic element when the steering shaft is rotated through the proper angle.

A spring metal contact 39 is formed as shown in Figures 6 and 7, and this contact as well as the metal strip 43 and the outer flange of the disc 32 are all secured together by means of the rivets 41 and 51.

Around the lower portion of the outer flange of the disc 32 are secured two other spring metal contacts 40 and 54, the contact 40 being held in place by the rivet 42, while the rivet for holding the contact 54 is not shown. Around the inner circumference of the housing 29 are grouped a plurality of switch contacts, best seen by reference to Figure 4. At the top of the housing is a contact 47 having a binding post 49 on the outer circumference of the housing. In a like manner the lower portion of the housing has contacts 55, 56, 48, 57 and 58, connected respectively to binding posts 51, 52, 50, 53 and 70.

A spring leaf 44 is securely attached by means of the screw 45 to the flanged disc 32. A slotted member 46 secured to the wall of the housing 29 allows the spring leaf 44 to ride along it when the shaft 25 is rotated in either direction, this rotation causing the leaf 44 to bend and be placed under tension. This spring leaf is designed to return the signal operating shaft 25 to neutral position when free to do so.

The circuit organization of Figure 4 includes a conventional tail light switch, the usual brake pedal operated stop-light switch, and a pair of standard single-filament electric bulbs constituting right and left rear signal lights. Also shown is a battery or source of current B, a current limiting resistance R, an adjustable resistance 71, a current interrupter or flasher, and a pilot lamp 16. It is assumed that the lead 24 of Figures 4 and 9 is connected to a conventional horn and thence up through the shaft 25 as shown in Figures 2 and 3.

Figure 9:
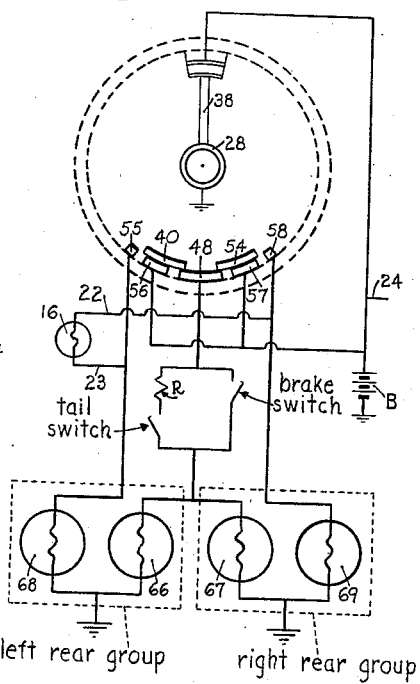
Figure 9 shows diagrammatically certain electrical elements of Figure 4 in a modification of the circuit organization.

In Figure 9 the circuit organization of Figure 4 is modified, the flasher being omitted and four signal lights 66, 67, 68 and 69 being employed.

*Control switch operation*

The operation of the direction signal control switch alone will first be described, omitting for the present the operation of the circuit organizations shown in Figures 4 and 9, and only assuming that current is supplied to the binding post 49.

As previously stated, the thermostat 38 is securely attached to the fixed shaft 28. This thermostat is so designed that it forms in effect a spring element which normally assumes the straight position shown in Figure 3, but which may be forced at any time to assume the bent or curved position shown in Figure 6. This results either from the action of one of the cams 52 and 53 when the disc 31 is rotated (Figure 6), or when the control handle 10 is actuated by the vehicle operator causing the shaft 25 and thus the disc 32 to be rotated. This rotation of the disc 32 results in an outward pressure upon the thermostat by one of the curved extending portions 59, 60, 61 and 62, depending upon the position of the handle 10 prior to actuation and also upon the direction in which the handle is rotated.

In addition, the thermostat 38 assumes a similar bent or curved position when current from the battery B is passed through it. No heating coil or winding for the thermostat is shown, as its composition and dimensions may be selected so as to dispense with the necessity for such a coil, especially since it has, compared to a majority of thermostatic devices, a relatively long interval of operation—say for example thirty seconds. However it will be obvious to those skilled in the art that such a heating coil may readily be employed if desired, the coil being preferably enclosed by a spring metal cover so as not to be damaged by repeated contact with the cams 52 and 53.

When the wheels of the vehicle are positioned for straight forward travel and the handle 10 is in neutral position the various elements of Figures 1, 2, 3, 4, 5 and 7 will have the relative position shown therein, this constituting their "neutral" position. Assume now that the vehicle operator wishes to indicate his intention of turning the vehicle, as for example to the left. He will then actuate the control handle 10 to the left, consequently rotating the members 11 and 18 and the signal operating shaft 25.

The rotation of the shaft 25 will rotate the flanged disc 32 with its curved extending portions 60 and 62, as well as their associated elements, the metal strip 43 and the contact 39. The movement of the curved extending portion 60 will result first in its contact with the thermostat 38 (see Figure 7), and then in its forcing this element away from normal position (in Figure 7, to the right). Continued rotation of the disc 32 will allow the thermostat to spring back to normal position around the curved extending portion 59 of the metal strip 43, and the parts will assume the relative position shown in Figure 8.

The position of the elements in Figure 8 constitutes the left settable direction signalling position of the handle 10. After such an actuation of this control handle, the operator may remove his hand from the handle and it will remain in this settable position, as the tension of the spring thermostat 38 and the form of the curved extending portion 59 are so chosen that the flanged disc 32 and its associated parts are prevented from being returned to neutral position as would normally result from the action of the spring 44.

However, it should be noted that the vehicle operator may under the above conditions (Figure 8) rotate the handle 10 to the right to force the curved extending portion 59 past the thermostat 38, and return the switch to neutral or to the right direction signalling position. The manual control dominates all the automatic controls, so that at any time following any movement of the handle 10 a sudden change to any other position is permissible.

It has been assumed that the vehicle is traveling straight forward and that the driver has indicated his intention of turning the vehicle to the left. In making the turn the steering wheel 12 is operated, and consequently the steering shaft 21 and the disc 31 secured thereto are both rotated counter-clockwise. When this rotation has reached a predetermined angle the cam 53 will engage the thermostat 38, and further movement will force the thermostat away from the disc 31 in the manner shown in Figure 6.

When this occurs, the curved extending portion 59 will be free to move past the thermostat 38, and such movement will result due to the action of the spring 44. The elements of Figure 8 will resume their relative position of Figure 7, and of course the handle 10 will likewise be returned to neutral position. Continued rotation of the shaft 21 will move the cam 53 past and away from the thermostat 38, the latter springing back to normal or straight position. Thus are means provided for the automatic return of the direction signal control switch to neutral position when the indicated turn is actually made.

It has been assumed that the vehicle operator carried out his intention of turning the vehicle. Suppose, however, that after indicating his intention as above described he alters this intention and continues to operate the vehicle on a straight course. Normally under such conditions he should return the handle 10 to neutral position. Nevertheless, should he neglect to do so for any reason, the present invention provides means for automatically doing this without any attention on his part, instead of having the erroneous indication continue indefinitely as would otherwise be the case.

Referring to Figure 8, it will be seen that with the handle 10 in its left settable direction signalling position the curved extending portion 59 is in contact with the thermostat 38. Current will thus flow from the binding post 49 (it has been assumed that current is supplied thereto, the circuit organization of Figure 4 being subsequently described) through contact 47, spring contact 39, metal strip 43, curved extending portion 59, thermostat 38, ring 30 to the grounded shaft 28, and the thermostat 38 will be heated. This heating will cause the thermostat to bend away from the disc 31 in the usual manner, and sufficient heating will result in its movement beyond the curved extending portion 59. The spring 44 now being free to return the disc 32 to neutral position it will do so.

The operation of the direction signal control switch is similar in theory for a right indication as for the left indication taken above as an example.

The time required by the thermostat 38 to heat sufficiently to allow the curved extending portion 59 (or 61) to be moved past it by the spring 44 should preferably be chosen so as to ordinarily allow enough time for the vehicle operator to make an indicated turn, and this thermostatically controlled resetting means should normally operate only in case the vehicle operator neglects to return the handle 10 to neutral position following an altered intention. In the usual sequence of operation the handle 10 will be returned to neutral position through operation of the steering gear controlled means as above described.

If desired an adjustable resistance 71 may be inserted between the battery B and the binding post 49 as illustrated. The adjustment of this resistance will determine the time interval of operation of the thermostatically controlled resetting means above described. If no control over the current supplied to the binding post 49 is found necessary this resistance may be omitted.

The cams 52 and 53 may be placed at any points desired on the face of the disc 31 so as to allow for any desired angle of rotation (less than approximately 180°) before making contact with the thermostat 38, and in fact only one cam need be employed for a desired rotation of approximately 180°.

It will be observed that the vehicle operator may actuate the handle 10 to a settable direction signalling position (as in Figure 8) and then continue the movement so as to keep the curved extending portion 59 (or 61) away from electrical contact with the thermostat 38. After manually holding the handle 10 against the tension of the spring 44 for any desired period a subsequent release of the handle will establish contact between the elements 38 and 59 (or 61) and heating of the former will begin.

It should be again emphasized that at any time, no matter what the status of the various elements may be, the handle 10 may be promptly moved from any position to any other position.

*Signal light operation*

The circuit organizations of Figures 4 and 9 will now be described, in each of which this direction signal control switch forms an integral part.

Referring first to Figure 4, it will be seen that contacts 47, 55, 56, 48, 57 and 58 are positioned in fixed spaced relation in the housing 29, and that contacts 39, 40 and 54 are securely attached to the disc 32. The relation of these contacts as shown in Figure 4 constitutes the "neutral position" of the switch. As such, the contact 39 is in electrical engagement with the contact 47, the contact 40 is in electrical engagement with both contacts 56 and 48, and the contact 54 is in electrical engagement with both contacts 48 and 57.

When the handle 10 is actuated, as for example to the left, the disc 32 will likewise be actuated as described above. In Figure 4 this rotation will be clockwise, due to the manner of taking the sectional view. The rotation will cause the spring contacts 39, 40 and 54 to be rotated, moving the contact 40 out of electrical engagement with the contact 48 and into electrical engagement with the contact 55, while remaining in electrical engagement with the contact 56. The switch is so designed, however, that this rotation will not disturb the electrical engagement of the contacts 39 and 47, and similarly the contact 54 will remain in electrical engagement with both contacts 48 and 57.

For a right actuation of the handle 10 the contact 54 will bridge the contacts 57 and 58, while the contact 40 will continue to bridge the contacts 56 and 48.

The spring contact 39 is intended to remain in electrical engagement with the contact 47 at all times and under all operating conditions.

It is now believed that the operation of the circuit organization of Figure 4 will be apparent from an inspection of the drawings. It should be noted that current is constantly supplied to the binding post 49 through the resistance 71, and that current is likewise supplied directly to the horn connection 24. The right and left rear signal lights illustrated should be so chosen that when energized by the full strength of the battery B they will have an illumination of conventional "stop light signal intensity." The resistance R is preferably chosen so as to reduce this illumination to conventional "tail light signal intensity."

During periods of good visibility the driver will normally operate the vehicle with the brake and tail switches in open circuit position. With the handle 10 in neutral at such time no current will flow in the system of Figure 4. If the driver now desires to display a direction signal he will actuate the handle 10, say for example to the left.

This will cause current to flow from battery B through the flasher and then through elements 51, 55, 40, 56, 52 to the left rear signal light which will be intermittently energized due to the action of the flasher. The right rear signal light will remain deenergized.

No reference light is necessary during periods of good visibility, as the structure of the vehicle itself serves as a "reference" for the flashing light. When the outlines of the vehicle can be seen the position of a flashing light thereon is instantly "located" to an observer.

Suppose now the handle 10 to be in neutral. Closing of the tail switch causes current to flow from battery B through elements tail switch, R, 50, 48, 40, 54, 56, 57, 52 and 53 to both rear signal lights to constantly energize them at tail light signal intensity due to the current limiting action of the resistance R. Closing of the brake switch will now in effect short-circuit the tail switch and its series resistance, and both rear signal lights will be constantly energized at stop light signal intensity. It will thus be seen that when the brake switch is closed it is immaterial as to whether or not the tail switch is closed insofar as its effect on the signal lights is concerned. Opening of the brake switch of course returns control to the tail switch.

Now assume that while the tail switch is closed, the brake switch open, and both rear signal lights constantly energized at tail light signal intensity, the operator actuates the handle 10 to the left. This will cause current to flow from battery B through elements flasher, 51, 55, 40, 56, 52 to the left rear signal light which will be intermittently energized. At the same time current will continue to flow through elements tail switch, R, 50, 48, 54, 57, 53 to the right rear signal light which will continue to be constantly energized at tail light signal intensity.

If the brake switch be closed under the above conditions, the intensity of illumination of the right rear signal light will be increased to stop light signal intensity without affecting the intermittent energization of the left rear signal light. It will now be seen that the sequence of operation of the three circuit controls does not in any way affect the final status of the signal lights.

The theory of operation of the circuit of Figure 4 is similar for a right actuation of the handle 10 as for the left actuation taken above as an example.

When either of the rear signal lights in Figure 4 is intermittently energized as described above, current will at the same time flow through the pilot lamp 16 which is connected in parallel electrical relation with the flasher as illustrated. However, since the capacity of each of the rear signal lights is assumed to be much greater than the capacity of the pilot lamp 16, the latter will in effect be short-circuited each time that the flasher passes current, and will only be visibly energized when the flasher is open. This will result in an alternate flashing of the lamp 16 and one of the rear signal lights, depending on whether the handle 10 is in right or left indicating position.

Figure 9 is a modification of Figure 4. The flasher is omitted and an additional pair of rear signal lights added. The lights are intended to be grouped as shown, 66 and 68 on the left of the vehicle and 67 and 69 on the right side. While the lights are grouped as shown by the broken lines in Figure 9, it is not necessary that the two lights on one side of the vehicle be in the same casing or container. They may be as widely separated as desired as long as they remain on one side of the vehicle and are visible from the rear.

In Figure 9 a direction signal is indicated by constantly energizing one of the lamps 68 and 69. In this circuit organization the lamps 66 and 67 perform the functions of tail and stop lamps only, and should be provided with the conventional red lenses. The lamps 68 and 69 should be provided with suitable distinguishing lenses, either of a different color or of a desired shape or form, as for instance an arrow, or a combination of such distinguishing characteristics.

The operating relation of the switch contacts 39, 47, 55, 56, 57, 58, 48, 40 and 54 is identical in both Figures 4 and 9. It will therefore not be repeated. The operation of the organization of Figure 9 will thus be obvious from an inspection of the circuit connections, and it will only be said that, with the handle 10 in neutral, closing of the tail switch will cause the lamps 66 and 67 to be constantly energized at tail light signal intensity. Closing of the brake switch will cause the same lamps to be constantly energized at stop light signal intensity.

When the handle 10 is rotated, as to the left, the lamp 68 will be constantly energized to indicate a direction signal. Current will at the same time flow (if either the tail or brake switch be closed) through both lamps 66 and 67, resulting in a tail or stop indication on both sides of the vehicle concurrently with a directional indication on one side of the vehicle.

When the lamp 68 is constantly energized as a direction signal as described above, current will at the same time flow through elements 23, 16, 22, 69 to ground. However, since the capacity of the lamp 69 (or 68) is assumed to be much greater than the capacity of the pilot lamp 16, the latter will be illuminated while the former will not be visibly energized.

The present disclosure thus includes many features. It enables the vehicle operator to indicate his intention of making a turn. If he actually makes the turn the indication will be automatically terminated. If he does not make the turn, and neglects to stop the indication, it will stop automatically after an interval of time. If he should alter his intention at any time after indicating it, he may promptly change the indication. With the same hand he may operate the horn and indicate a direction signal, either separately or simultaneously as desired, and with easy, natural movements. He has visible to him at all times a check on the operation of his direction signal lights. The customary tail and stop indications are also available to him.

While I have shown and described, and have pointed out in the annexed claims, certain novel features of my invention, it will be understood that various omissions, substitutions and changes in the form and details of the device illustrated may be made by those skilled in the art without departing from the spirit of the invention.

I claim:

1. A manually closable switch; a signal circuit including the switch; a control circuit also including the switch; a current source common to both circuits; said switch designed to energize both said circuits when closed; an electrically energized time-delay means in said control circuit; said time-delay means entering into mechanical engagement with the said switch upon manual closing of the latter and designed to operate approximately after a predetermined period of uninterrupted energization of the said control circuit following the closing of said switch to result in an opening of said switch and a consequent deenergization of both said circuits; an interruption in the energization of the said control circuit during the said predetermined period resulting in a deenergization of the said time-delay means, a postponement of its operation, and a corresponding maintenance of the energization of the said signal circuit.

2. In combination on a vehicle having a steering shaft; a pair of direction signal lights; a switch mounted at the lower end of said steering shaft, said switch having a neutral position and manually operable selectively to two settable direction signalling positions; means for biasing said switch to neutral position; means, including a source of current, responsive to the manual operation of said switch to either settable direction signalling position to energize one of said lights; and means responsive to a subsequent rotation of the said steering shaft through approximately a predetermined angle in either direction for releasing said switch from said settable position and permitting the said biasing means to return it to neutral position.

3. On a vehicle, the combination of a hollow steering shaft, a steering wheel on the shaft, a signal operating shaft mounted for oscillation within the steering shaft and provided with an operating member at the upper end thereof, said operating member having an "off" position and an "on" position, a signal exterior of the vehicle, means responsive to the movement of the operating member to "on" position to energize the signal, means responsive as a function of the rotation of the steering wheel for returning the operating member to "off" position, and means responsive as a function of the movement of the operating member to "on" position for returning the member to "off" position a predetermined period of time thereafter in the event that the member has not been previously returned to "off" position through operation of the second named means.

4. In a vehicle signalling system, two pairs of signal lights, one pair mounted on each side at the rear of the vehicle, each pair comprising a direction signal light and a stop-tail signal light; a tail light switch; a normally upon brake pedal operated switch; a third switch having a neutral position and manually operable selectively to two direction signalling positions; means, including a source of current, responsive to the closing of said first mentioned switch when said second mentioned switch is in open circuit position and said third switch is in neutral position to constantly energize the stop-tail signal light in each of the said pairs at tail light signal intensity; means responsive to the closing of said second mentioned switch while said third switch remains in neutral position to constantly energize the stop-tail signal light in each of the said pairs at stop light signal intensity; and means responsive to the closing of said third switch in either direction signalling position while said second mentioned switch remains closed to constantly energize the direction signal light in one of the said pairs while the stop-tail signal light in each of the said pairs remains constantly energized at stop light signal intensity; all of said means having elements in common.

5. In a signalling system on a vehicle equipped with a steering mechanism, two pairs of signal lights, one pair mounted on each side at the rear of the vehicle, each pair comprising a direction signal light and a stop-tail signal light, a tail light switch, a normally open brake pedal operated switch, a third switch having a neutral position and manually operable selectively to two direction signalling positions; means, including a source of current, responsive to the closing of said first mentioned switch when said second mentioned switch is in open circuit position to constantly energize the stop-tail signal light in each of the said pairs at tail light signal intensity, said third switch being in neutral position; means responsive to the closing of said second mentioned switch while said third switch remains in neutral position to constantly energize the stop-tail signal light in each of the said pairs at stop light signal intensity; means responsive to the closing of said third switch in either direction signalling position while said second mentioned switch remains closed to constantly energize the direction signal light in one of the said pairs while the stop-tail signal light in each of the said pairs remains constantly energized at stop light signal intensity; all of said means having elements in common; and further means subsequently responsive as a function of the selective operation of the vehicle steering mechanism for controlling the return of the third switch to neutral position.

6. In a vehicle signalling system, a pair of signal lights mounted on relatively opposite sides of the vehicle and visible from the rear thereof, a tail light switch, a normally open brake pedal operated switch, a third switch having a neutral position and manually operable selectively to two direction signalling positions; means, including a source of current, responsive to the closing of said first mentioned switch when said second mentioned switch is in open circuit position and said third switch is in neutral position to constantly energize both signal lights at tail light signal intensity; means responsive to the closing of said second mentioned switch while said third switch remains in neutral position to constantly energize both signal lights at stop light signal intensity; means, including a current interrupter, responsive to the closing of said third switch in either direction signalling position while said second mentioned switch remains closed to intermittently energize one of said signal lights while the other signal light remains constantly energized at stop light signal intensity; all of said means having elements in common; and a second current interrupter initially energized as a function of the closing of said third switch in either direction signalling position for controlling its return to neutral position approximately a predetermined interval of time thereafter.

7. In a signalling system on a vehicle equipped with a steering mechanism, a pair of signal lights mounted on opposite sides at the rear of the vehicle, a tail light switch, a second switch having a neutral position and manually operable selectively to two direction signalling positions; means, including a source of current, responsive to the closing of said first mentioned switch when said second switch is in neutral position to constantly energize both signal lights at tail light signal intensity; means, including a current interrupter, responsive to the closing of said second switch in either direction signalling position while said first mentioned switch remains closed to intermittently energize one of said signal lights while the other light remains constantly energized at tail light signal intensity; both of said means having elements in common; and multiple-controlled means for returning said second switch to neutral position, said means being mechanically controlled as a function of the selective operation of the said steering mechanism, said means being electrically controlled approximately a predetermined period of time after the manual operation of said second switch to either direction signalling position in the event that the mechanical control has not operated during this period.

8. In a vehicle signalling system, two pairs of signal lights, one pair mounted on each side at the rear of the vehicle, each pair comprising a direction signal light and a stop-tail signal light, a tail light switch, a normally open brake pedal operated switch, a third switch having a neutral position and manually operable selectively to two direction signalling positions; means, including a source of current, responsive to the closing of said first mentioned switch when said second mentioned switch is in open circuit position and said third switch is in neutral position to constantly energize the stop-tail signal light in each of the said pairs at tail light signal intensity; means responsive to the closing of said second mentioned switch while said third switch remains in neutral position to constantly energize the stop-tail signal light in each of the said pairs at stop light signal intensity; means responsive to the closing of said third switch in either direction signalling position while said second mentioned switch remains closed to constantly energize the direction signal light in one of the said pairs while the stop-tail signal light in each of the said pairs remains constantly energized at stop light signal intensity; all of said means having elements in common; and further means initially energized as a function of the closing of the said third switch in either direction signalling position for controlling its return to neutral position approximately a predetermined period of time thereafter.

9. In a signalling system on a vehicle equipped with a steering mechanism, a pair of signal lights mounted on relatively opposite sides of the vehicle and visible from the rear thereof, a tail light switch, a normally open brake pedal operated switch, a third switch biased to neutral position and manually operable selectively to two settable direction signalling positions; means, including a source of current, responsive to the closing of said first mentioned switch when said second mentioned switch is in open circuit position and said third switch is in neutral position to constantly energize both signal lights at tail light signal intensity; means, including a current interrupter, responsive to the closing of said third switch in either direction signalling position as said first mentioned switch remains closed and said second mentioned switch remains open to intermittently energize one of the said lights while the other light remains constantly energized at tail light signal intensity; means responsive to the closing of said second mentioned switch while said third switch remains closed to increase the energization of the said constantly energized light to stop light signal intensity while the other light remains intermittently energized; all of said means having elements in common; and further means responsive as a function of the selective operation of the vehicle steering mechanism for returning the said third switch to neutral position.

10. In a signalling system on a vehicle equipped with a steering mechanism, a pair of signal lights mounted on opposite sides of the vehicle and at the rear thereof, a normally open brake pedal operated switch, a second switch having a neutral position and manually operable selectively to two settable direction signalling positions; means, including a source of current, responsive to the closing of said first mentioned switch when said second switch is in neutral position to constantly energize both signal lights at stop light signal intensity; means, including a current interrupter, responsive to the closing of said second switch in either direction signalling position while said first mentioned switch remains closed to intermittently energize one of the said signal lights while the other light remains constantly energized at stop light signal intensity; both of said means having elements in common; and further multiple-controlled means for returning the second switch to neutral position, said means being mechanically controlled as a function of the selective operation of the vehicle steering mechanism, said means being electrically controlled approximately a predetermined period of time after the manual operation of the second switch to either of said settable direction signalling positions in the event that the said mechanical control has not operated during this predetermined period.

HOWARD J. MURRAY, Jr.